United States Patent
Akino et al.

(10) Patent No.: US 12,104,062 B2
(45) Date of Patent: Oct. 1, 2024

(54) ASPHALT COMPOSITION AND MANUFACTURING METHOD THEREFOR, AND MANUFACTURING METHOD FOR ASPHALT MIXTURE

(71) Applicant: KAO CORPORATION, Tokyo (JP)

(72) Inventors: Yusuke Akino, Wakayama (JP); Ryoichi Hashimoto, Iwade (JP); Kohei Yamada, Wakayama (JP); Yasukazu Kumita, Wakayama (JP); Kazutomo Osaki, Wakayama (JP)

(73) Assignee: KAO CORPORATION, Tokyo (JP)

( * ) Notice: Subject to any disclaimer, the term of this patent is extended or adjusted under 35 U.S.C. 154(b) by 664 days.

(21) Appl. No.: 17/423,164

(22) PCT Filed: Jan. 21, 2020

(86) PCT No.: PCT/JP2020/001883
§ 371 (c)(1),
(2) Date: Jul. 15, 2021

(87) PCT Pub. No.: WO2020/153341
PCT Pub. Date: Jul. 30, 2020

(65) Prior Publication Data
US 2022/0127460 A1    Apr. 28, 2022

(30) Foreign Application Priority Data

Jan. 21, 2019  (JP) ................. 2019-008044

(51) Int. Cl.
| | | |
|---|---|---|
| *C08L 95/00* | (2006.01) | |
| *C08L 1/02* | (2006.01) | |
| *C08L 67/00* | (2006.01) | |
| *E01C 7/22* | (2006.01) | |
| *E01C 7/26* | (2006.01) | |
| *E01C 11/16* | (2006.01) | |

(52) U.S. Cl.
CPC ............... *C08L 95/00* (2013.01); *C08L 1/02* (2013.01); *C08L 67/00* (2013.01); *E01C 7/22* (2013.01); *E01C 7/265* (2013.01); *E01C 11/165* (2013.01)

(58) Field of Classification Search
CPC ............ C08L 1/02; C08L 67/00; C08L 95/00; E01C 7/22; E01C 7/265; E01C 11/165
USPC ............................ 404/17, 32, 72, 77, 90, 95
See application file for complete search history.

(56) References Cited

U.S. PATENT DOCUMENTS

| | | | | |
|---|---|---|---|---|
| 4,606,963 A | * | 8/1986 | Farrell | E01C 13/065 428/150 |
| 7,897,254 B2 | * | 3/2011 | Kadrmas | C08L 95/005 404/71 |
| 2003/0091389 A1 | * | 5/2003 | Zentner | E01C 11/005 404/17 |
| 2008/0023383 A1 | * | 1/2008 | Sansalone | B01J 20/06 210/170.03 |
| 2017/0253528 A1 | * | 9/2017 | Kim | C04B 24/36 |
| 2017/0313826 A1 | * | 11/2017 | Jansen | C08H 8/00 |
| 2020/0149226 A1 | | 5/2020 | Hashimoto et al. | |
| 2020/0181409 A1 | | 6/2020 | Bueno Perisée et al. | |
| 2020/0224033 A1 | | 7/2020 | Hashimoto et al. | |

FOREIGN PATENT DOCUMENTS

| | | |
|---|---|---|
| JP | H01-279981 A | 11/1989 |
| JP | 2000044808 A | 2/2000 |
| JP | 2001158857 A | 6/2001 |
| JP | 2011111712 A | 6/2011 |
| JP | 2018003580 A | 1/2018 |
| JP | 2019019325 A | 2/2019 |
| JP | 2019019663 A | 2/2019 |
| JP | 2019508608 A | 3/2019 |
| WO | WO-2019017289 | 1/2019 |

OTHER PUBLICATIONS

Extended European Search Report issued Sep. 19, 2022 in Patent Application No. 20744526.3, 9 pages.
International Search Report issued Apr. 7, 2020 in PCT/JP2020/001883 (with English translation), 5 pages.

* cited by examiner

*Primary Examiner* — Raymond W Addie
(74) *Attorney, Agent, or Firm* — Element IP, PLC

(57) ABSTRACT

The present invention relates to an asphalt composition containing asphalt, cellulose, and a polyester.

16 Claims, No Drawings

ASPHALT COMPOSITION AND MANUFACTURING METHOD THEREFOR, AND MANUFACTURING METHOD FOR ASPHALT MIXTURE

FIELD OF THE INVENTION

The present invention relates to an asphalt composition and a method for producing the same, and a method for producing an asphalt mixture.

BACKGROUND OF THE INVENTION

An asphalt pavement using an asphalt mixture has been performed for paving driveways, parking spaces, cargo yards, sidewalks, etc., because of relatively easy construction and a short period of time from beginning of paving works to traffic start.

The asphalt pavement includes a road surface that is formed of an asphalt mixture containing aggregates bonded with each other through asphalt, and hence, paved roads exhibit good hardness and good durability.

However, this asphalt pavement involved such a problem that it deteriorates over time, resulting in the occurrence of rutting or cracking.

For the purpose of reducing an environmental load while inhibiting the occurrence of rutting on a pavement surface, JP 2011-111712 A (PTL 1) discloses an asphalt concrete composition for pavement composed of an asphalt mixture and a plant fiber body, in which the plant fiber body is a kenaf fiber or a kenaf fiber-made mesh sheet.

In addition, for the purpose of providing an asphalt composition having improved flow resistance, abrasion resistance, and crack resistance of the asphalt, JP 2001-158857 A (PTL 2) discloses an asphalt composition containing asphalt and a hydrophobized cellulose fiber.

SUMMARY OF THE INVENTION

The present invention relates to the following [1] to [6].
[1] An asphalt composition containing asphalt, cellulose, and a polyester.
[2] An asphalt composition including a blend of cellulose in an amount of 0.01 parts by mass or more and 10 parts by mass or less based on 100 parts by mass of asphalt and 2 parts by mass or more and 30 parts by mass or less of a polyester based on 100 parts by mass of the asphalt.
[3] A method for producing the asphalt composition as set forth above in [1] or [2], including a step of mixing the asphalt, the cellulose, and the polyester.
[4] A method for producing an asphalt mixture including mixing asphalt and an aggregate to obtain a mixture; and then mixing the mixture with a polyester and cellulose.
[5] A method for producing an asphalt mixture including mixing asphalt, a polyester, and cellulose to obtain an asphalt composition; and then mixing the asphalt composition with an aggregate.
[6] Use of the asphalt composition as set forth above in [1] or [2] for road pavement.

DETAILED DESCRIPTION OF THE INVENTION

[Asphalt Composition]

The asphalt composition of the present invention contains asphalt, cellulose, and a polyester. From the viewpoint of rutting resistance and cracking resistance (fatigue cracking resistance), the content or blending amount of the cellulose is preferably 0.01 parts by mass or more and 10 parts by mass or less based on 100 parts by mass of the asphalt. From the viewpoint of rutting resistance and cracking resistance, a crystallization index of the cellulose is preferably 50% or less. From the viewpoint of rutting resistance and cracking resistance, the content or blending amount of the polyester is preferably 2 parts by mass or more and 30 parts by mass or less based on 100 parts by mass of the asphalt. The cellulose having a crystallization index of 50% or less is hereinafter also referred to as "amorphous cellulose".

The present inventors have found that when the asphalt composition contains a specified amount of the cellulose (preferably an amorphous cellulose, a crystallization index of which is a specified value) and also a specified amount of the polyester, the occurrence of rutting and fatigue cracking of asphalt pavement obtained by using the asphalt composition is inhibited.

Although a detailed mechanism in which the effect of the present invention is obtained is not elucidated yet, a part thereof may be considered as follows. That is, in order to improve the mechanical strength, it has hitherto been performed to add a reinforced fiber to asphalt. In the present invention, it may be presumed that by using cellulose not having a strong crystal structure and having a low crystallization index, dispersibility of the cellulose in the asphalt composition is improved, whereby the mechanical properties, such as rutting resistance and fatigue cracking resistance, are improved. Furthermore, it may be presumed that by using the cellulose and the polyester in combination, the polyester exhibits a high intermolecular force (van der Waals force) to adsorb onto an aggregate, and by giving an effect for anchoring the aggregate to the asphalt, the flow resistance is improved, and the mechanical properties, such as rutting resistance and fatigue cracking resistance, are further improved.

The "rutting" means unevenness that is continuously generated in a longitudinal direction in a road driving portion when at a high temperature in the season of summer or the like, an asphalt layer forming a pavement surface flows. The rutting correlates with the plastic flow resistance of the asphalt composition that is a binder of the asphalt pavement, and according to the binder standards of SUPERPAVE (Japan Road Association, "Manual for Test Method of Pavement (Separate Volume)", 1996), it is possible to evaluate the rutting in terms of $G^*/\sin \delta$ of the asphalt composition (binder). Here, $G^*$ represents a complex modulus of elasticity, and $G^*$ and $\sin \delta$ are measured with a rheometer.

In view of the fact that the larger the value of $G^*/\sin \delta$, the larger the plastic flow resistance is, it is evaluated that the asphalt pavement with excellent rutting resistance can be provided by the foregoing asphalt composition.

Meanwhile, the "fatigue cracking" is a phenomenon in which the pavement surface is cracked owing to a repeated load. According to the binder standards of SUPERPAVE (Japan Road Association, "Manual for Test Method of Pavement (Separate Volume)", 1996), it is possible to evaluate the fatigue cracking resistance in terms of $G^*\sin \delta$ of the asphalt composition (binder). Here, $G^*$ represents a complex modulus of elasticity, and $G^*$ and $\sin \delta$ are measured with a rheometer.

In view of the fact that the smaller the value of $G^*\sin \delta$, the larger the fatigue cracking resistance is, it is evaluated that the asphalt pavement with excellent fatigue cracking resistance can be provided by the foregoing asphalt composition.

In the following description, the fact that the viscoelasticity of the asphalt composition is improved means that the G*sin δ becomes small with an increase of the value of G*/sin δ.

Definitions and so on of various terminologies in this specification are as follows.

The "binder mixture" means a mixture containing asphalt and a thermoplastic elastomer and is, for example, a concept including asphalt modified with a thermoplastic elastomer as mentioned later (hereinafter also referred to as "modified asphalt").

In the polyester, the term "alcohol component-derived structural unit" means a structure resulting from eliminating a hydrogen atom from a hydroxy group of an alcohol component; and the term "carboxylic acid component-derived structural unit" means a structure resulting from eliminating a hydroxy group from a carboxy group of a carboxylic acid component.

The term "carboxylic acid compound" is a concept including not only a carboxylic acid itself but also an anhydride capable of being decomposed during the reaction to produce an acid and an alkyl ester of a carboxylic acid (for example, the carbon number of the alkyl group is 1 or more and 3 or less). In the case where the carboxylic acid compound is an alkyl ester of a carboxylic acid, the carbon number of the alkyl group that is an alcohol residue of the ester is not counted in the carbon number of the carboxylic acid compound.

<Asphalt>

The asphalt composition of the present invention contains asphalt.

As the asphalt, various kinds of asphalts can be used. Examples thereof include in addition to a straight asphalt that is petroleum asphalt for pavement, modified asphalts. Examples of the modified asphalt include blown asphalt; and asphalt modified with a polymer material, such as a thermoplastic elastomer and a thermoplastic resin. The term "straight asphalt" refers to a residual bituminous material obtained by treating a crude oil with an atmospheric distillation apparatus, a vacuum distillation apparatus, or the like. In addition, the term "blown asphalt" means asphalt obtained by heating a mixture of a straight asphalt and a heavy oil and then blowing air thereinto to undergo oxidation. From the viewpoint of rutting resistance and cracking resistance, the modified asphalt is preferred, and from the viewpoint of versatility, the straight asphalt is preferred.

[Thermoplastic Elastomer]

From the viewpoint of rutting resistance and cracking resistance, it is preferred that the asphalt composition contains a thermoplastic elastomer. The asphalt and the thermoplastic elastomer are preferably used as a binder mixture that is a mixture of these materials. Examples of the binder mixture include a straight asphalt modified with a thermoplastic elastomer (modified asphalt).

Examples of the thermoplastic elastomer include at least one selected from the group consisting of a styrene/butadiene block copolymer (hereinafter also referred to simply as "SB"), a styrene/butadiene/styrene block copolymer (hereinafter also referred to simply as "SBS"), a styrene/butadiene random copolymer (hereinafter also referred to simply as "SBR"), a styrene/isoprene block copolymer (hereinafter also referred to simply as "SI"), a styrene/isoprene/styrene block copolymer (hereinafter also referred to simply as "SIS"), a styrene/isoprene random copolymer (hereinafter also referred to simply as "SIR"), an ethylene/vinyl acetate copolymer, and an ethylene/acrylic acid ester copolymer.

Examples of commercially available products of the ethylene/acrylic acid ester copolymer include "ELVALOY" (manufactured by DuPont).

Of these thermoplastic elastomers, from the viewpoint of more improving the rutting resistance and the cracking resistance, at least one selected from the group consisting of a styrene/butadiene block copolymer, a styrene/butadiene/styrene block copolymer, a styrene/butadiene random copolymer, a styrene/isoprene block copolymer, a styrene/isoprene/styrene block copolymer, and a styrene/isoprene random copolymer is preferred, and at least one selected from the group consisting of a styrene/butadiene random copolymer and a styrene/butadiene/styrene block copolymer is more preferred.

From the viewpoint of more improving the rutting resistance and the cracking resistance, the content of the thermoplastic elastomer in the asphalt composition is preferably 0.1% by mass or more, more preferably 0.5% by mass or more, still more preferably 1% by mass or more, and yet still more preferably 2% by mass or more, and it is preferably 30% by mass or less, more preferably 20% by mass or less, still more preferably 10% by mass or less, and yet still more preferably 5% by mass or less, based on 100% by mass of the asphalt composition.

In the asphalt composition, from the viewpoint of more improving the rutting resistance and the cracking resistance, a ratio of the thermoplastic elastomer is preferably 0.1 parts by mass or more, more preferably 0.5 parts by mass or more, still more preferably 1 part by mass or more, and yet still more preferably 2 parts by mass or more, and it is preferably 30 parts by mass or less, more preferably 20 parts by mass or less, still more preferably 10 parts by mass or less, and yet still more preferably 5 parts by mass or less, based on 100 parts by mass of the asphalt.

In the asphalt composition of the present invention, from the viewpoint of rutting resistance and cracking resistance and the viewpoint of exhibiting an asphalt performance, the content of the asphalt is preferably 60% by mass or more, more preferably 65% by mass or more, and still more preferably 70% by mass or more, and from the viewpoint of containing the cellulose and the polyester to improve the rutting and the cracking, it is preferably 98% by mass or less, more preferably 95% by mass or less, and still more preferably 90% by mass or less.

<Cellulose>

The asphalt composition of the present invention contains cellulose. Although the cellulose is not particularly limited so long as it is cellulose, it is preferred that the asphalt composition contains cellulose having a crystallization index of 50% or less (amorphous cellulose). So far as cellulose having a crystallization index of 50% or less is concerned, in view of the fact that a strong crystal structure (hydrogen bond) of the cellulose is dissociated, an interaction between the polyester and the cellulose is readily obtained, so that an effect for improving the viscoelasticity of the asphalt composition and improving the rutting resistance and the cracking resistance becomes high, and hence, such is preferred.

In the present invention, the crystallization index of the cellulose is a crystallization index of type I cellulose calculated from a diffraction intensity value by the X-ray crystal diffraction method according to the Segal method and is defined by the following calculation formula (A).

Crystallization index of cellulose (%)=[($I_{22.6}$−$I_{18.5}$)/$I_{22.6}$]×100    (A)

In the formula (A), $I_{22.6}$ represents a diffraction intensity of a lattice plane (002 plane) in the X-ray diffraction (diffraction angle $2\theta=22.6°$), and $I_{18.5}$ represents a diffraction intensity of an amorphous part (diffraction angle $2\theta=18.5°$).

In this specification, cellulose having a crystallization index of 50% or less is occasionally referred to as "amorphous cellulose", whereas cellulose having a crystallization index of more than 50% is occasionally referred to as "crystalline cellulose". The term "type I cellulose" refers to a crystal form of a natural cellulose. The crystallization index of the type I cellulose is also related to physical properties and chemical properties of the cellulose, and as its value is large, hardness and density and the like increase, but elongation, flexibility, and chemical reactivity are lowered.

From the viewpoint of more improving the viscoelasticity of the asphalt composition and also rutting resistance and cracking resistance, the crystallization index of the cellulose which is used in the present invention is preferably 50% or less, more preferably 45% or less, and still more preferably 40% or less. According to the crystallization index of the type I cellulose as defined by the calculation formula (A), though there is a case where the calculated value becomes minus, in the case where the calculated value becomes minus, the crystallization index of the type I cellulose is defined as 0%. In consequence, from the viewpoint of rutting resistance and cracking resistance, the crystallization index of the cellulose which is used in the present invention is preferably 0% or more, more preferably 1% or more, and still more preferably 10% or more. In addition, though a combination of two or more kinds of celluloses having a different crystallization index from each other may be used in the present invention, the crystallization index of the cellulose in that case means a crystallization index determined from a weighted average of the celluloses to be used, and it is preferred that a value thereof falls within the aforementioned range.

Although the amorphous cellulose is not particularly limited so long as its crystallization index is 50% or less, for example, cellulose obtained by subjecting a cellulose-containing raw material to a mechanical treatment or the like as mentioned later is preferred.

The cellulose-containing raw material is not particularly limited, and respective sites of plants, such as trunk, branch, leaf, stem, root, seed, and fruit, for example, plant stems and leafs, such as rice straw and corn stem; and plant shells, such as rice husk, palm shell, and coconut shell, can be used. In addition, pulps, such as wood pulps manufactured from lumber from thinning, pruned branch, various wood chips, wood pulp manufactured from wood, and cotton linter pulp obtained from fibers around cotton seeds; papers, such as newspaper, cardboard, magazine, and wood-free paper, may be used. However, pulps are preferred from the viewpoint of obtaining a less colored amorphous cellulose. Furthermore, regenerated pulps and regenerated papers obtained by regenerating paper (wastepaper), such as newspaper, cardboard, magazine, and wood-free paper can also be used.

In addition, as the cellulose-containing raw material, commercially available crystalline celluloses can be used. Examples of the commercially available crystalline cellulose include "KC FLOCK" (manufactured by Nippon Paper Chemical Co., Ltd.) and "CEOLUS" (manufactured by Asahi Kasei Chemicals Corporation).

The form of such a cellulose-containing raw material is not particularly limited, and various forms, such as a chip form and a sheet form, can be used. The crystallization index of the type I cellulose of commercially available pulp is typically 80% or more, and the crystallization index of the type I cellulose of the commercially available crystalline cellulose is typically 60% or more.

In the cellulose-containing raw material, the cellulose content in the residual component in the case of eliminating water from the raw material is preferably 20% by mass or more, more preferably 40% by mass or more, and still more preferably 60% by mass or more. For example, in the commercially available pulp, the cellulose content in the residual component in the case of eliminating water therefrom is typically 75 to 99% by mass, and lignin and the like are contained as other component. A method for eliminating water from the raw material is not particularly limited, and the water can be eliminated by, for example, vacuum drying or drying with dry air. In this specification, the aforementioned cellulose content means a total amount of the cellulose amount and the hemicellulose amount. The cellulose content can be measured by the method described in the section of Examples of JP 2011-137094 A.

In the case of using, as the cellulose-containing raw material, a pulp, a regenerated paper, or the like, from the viewpoint of improving the viscoelasticity of the asphalt composition, the lignin amount in the cellulose-containing raw material is preferably 20% by mass or less, more preferably 15% by mass or less, and still more preferably 10% by mass or less. A structural unit of the lignin is not particularly limited, and there are exemplified known ones. From the viewpoint of improving the viscoelasticity of the asphalt composition, the structural unit of the lignin is preferably a guaiacyl type, a syringyl type, or a p-hydroxyphenyl type.

Examples of a method for reducing the lignin include the alkaline cooking method described in JP 2008-92910 A; and the sulfuric acid decomposition method described in JP 2005-229821 A.

The moisture content of the cellulose-containing raw material is preferably 10% by mass or less, more preferably 5% by mass or less, still more preferably 3% by mass or less, and yet still more preferably 1.8% by mass or less. When the moisture content of the cellulose-containing raw material is 10% by mass or less, not only the cellulose-containing raw material can be easily pulverized, but also the decrystallization rate by the pulverization treatment is improved, whereby the crystallization index can be efficiently lowered for a short time.

The cellulose-containing raw material that is used for the decrystallization treatment in the present invention is preferably one having a bulk density preferably in a range of 50 $kg/m^3$ or more and 600 $kg/m^3$ or less and a specific surface area preferably in a range of 0.2 $m^2/kg$ or more and 750 $m^2/kg$ or less.

From the viewpoint of more efficiently performing the pulverization and the decrystallization and also rutting resistance and cracking resistance, the bulk density of the cellulose-containing raw material that is used for the decrystallization treatment in the present invention is preferably 50 $kg/m^3$ or more, more preferably 65 $kg/m^3$ or more, and still more preferably 100 $kg/m^3$ or more. When this bulk density is 50 $kg/m^3$ or more, the cellulose-containing raw material has an appropriate capacity, and therefore, handling properties are improved. In addition, the amount of the raw material charged in a pulverizer can be made high, and therefore, the processing capability is improved. Meanwhile, from the viewpoint of handling properties and productivity, an upper limit of this bulk density is preferably 600 $kg/m^3$ or less, more preferably 500 $kg/m^3$ or less, and still more preferably 400 $kg/m^3$ or less. From these viewpoints, the bulk density is preferably 50 to 600 kg/m$^3$, more preferably 65 to 500 kg/m$^3$, and still more preferably 100 to 400 kg/m$^3$. The bulk density can be measured by the method described in the section of Examples of JP 2011-1547 A.

From the viewpoint of efficiently dispersing the pulverized raw material in a pulverizer and also rutting resistance and cracking resistance, the cellulose-containing raw material to be supplied in the pulverizer is preferably one having a specific surface area in a range of 0.2 m$^2$/kg or more and 750 m$^2$/kg or less. When this specific surface area is 0.2 m$^2$/kg or more, when supplying in the pulverizer, the pulverized raw material can be efficiently dispersed in the pulverizer, and it can attain the predetermined crystallization index and particle diameter without requiring a long time. Meanwhile, from the viewpoint of productivity, an upper limit of this specific surface area is preferably 750 m$^2$/kg or less. From these viewpoints, this specific surface area is more preferably 0.65 m$^2$/kg or more, and still more preferably 0.8 m$^2$/kg or more, and it is more preferably 200 m$^2$/kg or less, and still more preferably 50 m$^2$/kg or less. The specific surface area can be measured by the method described in the section of Examples of JP 2011-1547 A.

By treating the cellulose-containing raw material with a pulverizer, the cellulose-containing raw material is pulverized, whereby the cellulose can be efficiently decrystallized for a short time.

In the case where the cellulose-containing raw material to be supplied in the pulverizer is in a chip form of 1 mm in square or more, from the viewpoint of efficiently dispersing the pulverized raw material in the pulverizer and also rutting resistance and cracking resistance, the specific surface area is preferably 0.2 m$^2$/kg or more, more preferably 0.65 m$^2$/kg or more, and still more preferably 0.8 m$^2$/kg or more, and it is preferably 4 m$^2$/kg or less, more preferably 3.5 m$^2$/kg or less, and still more preferably 3 m$^2$/kg or less.

In the case where the cellulose-containing raw material to be supplied in the pulverizer is in a particulate form of 1 mm or less, from the viewpoint of productivity and efficiently dispersing the pulverized raw material in the pulverizer and also rutting resistance and cracking resistance, the specific surface area is preferably 3 m$^2$/kg or more, more preferably 4.5 m$^2$/kg or more, and still more preferably 7.5 m$^2$/kg or more, and it is preferably 750 m$^2$/kg or less, more preferably 200 m$^2$/kg or less, and still more preferably 50 m$^2$/kg or less.

[Pre-Treatment of Decrystallization Treatment]

From the viewpoint of rutting resistance and cracking resistance, in the case of using a cellulose-containing raw material having a bulk density of less than 50 kg/m$^3$, it is preferred to perform a pre-treatment so as to have a bulk density in a range of 50 kg/m$^3$ or more and 600 kg/m$^3$ or less, or a specific surface area in a range of 0.2 m$^2$/kg or more and 750 m$^2$/kg or less. For example, by performing a cutting treatment and/or a coarse pulverization treatment as the pre-treatment of the cellulose-containing raw material, it is possible to control the bulk density and the specific surface area of the cellulose-containing raw material to the aforementioned preferred ranges. From the viewpoint of producing the amorphous cellulose in a small number of processes, it is preferred to perform the cutting treatment as the pre-treatment of the cellulose-containing raw material.

[Cutting Treatment]

As a method for cutting the cellulose-containing raw material, an appropriate method can be selected according to the type and shape of the cellulose-containing raw material. Examples thereof include a method of using at least one cutting machine selected from a shredder, a slitter cutter, and a rotary cutter.

In the case of using a sheet-form cellulose-containing raw material, a shredder or a slitter cutter is preferably used as the cutting machine, and from the viewpoint of productivity, a slitter cutter is more preferably used.

When a slitter cutter is used, the sheet-form cellulose-containing raw material is cut along the longitudinal direction thereof by means of a roller cutter, thereby providing long strips. Subsequently, the long strips are cut into short pieces along the transverse (width) direction by means of fixed blades and rotary blades, thereby readily providing dice-form cellulose-containing raw material pieces. As the slitter cutter, a sheet pelletizer, manufactured by HORAI Co., Ltd. or a super cutter, manufactured by Ogino Seiki Co., Ltd. can be preferably adopted. By means of this machine, a sheet-form cellulose-containing raw material can be cut into pieces of about 1 to 20 mm in square.

In the case where a wood material, such as lumber from thinning, pruned-off branch, and building waste, or a non-sheet cellulose-containing raw material is cut, a rotary cutter is preferably used. A rotary cutter is configured of rotary blades and a screen. By the action of the rotary blades, cut pieces of the cellulose-containing raw material having a size equal to or smaller than the opening size of the screen can be readily provided. If required, a fixed blade is provided, and the raw material can be cut by means of the rotary blades and the fixed blade.

In the case of using a rotary cutter, the size of the resulting coarsely pulverized product can be controlled by changing the opening size of the screen. From the viewpoint of rutting resistance and cracking resistance, the opening size of the screen is preferably 1 mm or more, more preferably 2 mm or more, and still more preferably 3 mm or more, and it is preferably 70 mm or less, more preferably 50 mm or less, and still more preferably 40 mm or less. When the screen has an opening size of 1 mm or more, a coarsely pulverized product having an appropriate bulkiness is obtained, and the handling properties thereof are improved. When the screen has an opening size of 70 mm or less, the product has a size suitable as the pulverized raw material to be subjected to a post-pulverization treatment, and therefore, the load can be reduced.

The size of the cellulose-containing raw material obtained after the cutting treatment is preferably 1 mm in square or more, and more preferably 2 mm in square or more, and it is preferably 70 mm in square or less, and more preferably 50 mm in square or less. By cutting in the aforementioned size, a post-drying treatment can be efficiently performed with ease, and the load required for pulverization in the post-pulverization treatment can be reduced.

[Coarse Pulverization Treatment]

Subsequently, from the viewpoint of rutting resistance and cracking resistance, the cellulose-containing raw material, preferably the cellulose-containing raw material obtained through the aforementioned cutting treatment, may be further subjected to a coarse pulverization treatment, as the need arises. The coarse pulverization treatment is preferably an extrusion treatment. A compression shear force is allowed to act through an extruder treatment, thereby breaking the crystal structure of cellulose. Thus, the cellulose-containing raw material is powdered, whereby the bulk density can be further increased.

In the method of mechanically pulverizing the cellulose-containing raw material by allowing a compression shear force to act, when an impact-type pulverizer that is conventionally generally adopted, for example, a cutter mill, a hammer mill, and a pin mill, is adopted, the pulverized material tends to suffer from flocculation to become bulky, whereby the handling properties are deteriorated, and a mass-based capability is lowered. On the other hand, by using an extruder, a pulverized raw material having a desired bulk density is obtained, resulting in improved handling properties.

Although the type of the extruder may be either a single-screw type or a twin-screw type, from the viewpoint of enhancement in conveying capability, etc., a twin-screw extruder is preferred.

As the twin-screw extruder, there can be used a conventionally known twin-screw extruder in which two screws are rotatably inserted into a cylinder. The rotational directions of the two screws in the twin-screw extruder may be either identical or reverse to each other. From the viewpoint of enhancement in conveying capability, the screws are preferably rotated in the same direction.

The type of meshing of the screws in the extruder may be any of a complete meshing type, a partially meshing type, and a de-meshing type. From the viewpoint of enhancement in treating capability, an extruder of a complete meshing type or a partially meshing type is preferred.

From the viewpoint of applying a strong compression shear force and also the rutting resistance and the cracking resistance, the extruder is preferably provided with a so-called kneading disk segment in any portion of the respective screws thereof.

The kneading disk segment is configured of a plurality of kneading disks which are continuously arranged in combination while offsetting their positions at a constant phase, for example, at intervals of 90°, and is capable of applying an extremely strong shear force to the cellulose-containing raw material with rotation of the screws by forcibly passing the raw material through a narrow gap between the kneading disks or between the kneading disk and the cylinder. The screw preferably has such a configuration that the kneading disk segments and a plurality of screw segments are arranged in an alternate relation to each other. In the twin-screw extruder, the two screws are preferably identical in structure to each other.

As the method of the coarse pulverization treatment, a method in which the cellulose-containing raw material, preferably the cellulose-containing raw material obtained through the aforementioned cutting treatment, is charged into an extruder and continuously treated. From the viewpoint of rutting resistance and cracking resistance, a shear rate is preferably 10 sec$^{-1}$ or more, more preferably 20 sec$^{-1}$ or more, still more preferably 50 sec$^{-1}$ or more, and yet still more preferably 500 sec$^{-1}$ or more, and it is preferably 30,000 sec$^{-1}$ or less, and more preferably 3,000 sec$^{-1}$ or less. When the shear rate is 10 sec$^{-1}$ or more, the pulverization effectively proceeds. Although other treatment conditions are not particularly limited, a treatment temperature is preferably 5 to 200° C.

The number of passes by the extruder may be only one (pass) to attain a sufficient effect. However, from the viewpoint of reducing the crystallization index and polymerization degree of cellulose, in the case where the one-pass treatment is unsatisfactory, 2 or more passes are preferably conducted. In addition, from the viewpoint of productivity, the number of passes is preferably 1 or more and 10 or less. By repeating the pass, coarse particles are pulverized, whereby a powdery cellulose-containing raw material having a less fluctuation in particle diameter can be obtained. When conducting 2 or more passes, a plurality of the extruders may be arranged in series in consideration of production capability.

From the viewpoint of efficiently dispersing the pulverized raw material in the pulverizer for the decrystallization treatment and also rutting resistance and cracking resistance, an average particle diameter (median diameter) of the cellulose-containing raw material obtained after the coarse pulverization treatment is preferably 0.01 mm or more and 1 mm or less. When this average particle diameter is 1 mm or less, the pulverized raw material can be efficiently dispersed in the pulverizer in the decrystallization treatment, whereby the particle diameter can be adjusted to a predetermined level without requiring a long time. On the other hand, from the viewpoint of productivity, a lower limit of the average particle diameter is preferably 0.01 mm or more. From these viewpoints, the average particle diameter is more preferably 0.03 mm or more, and sill more preferably 0.05 mm or more, and it is more preferably 0.7 mm or less, and still more preferably 0.5 mm or less. The average particle diameter can be measured by the method described in the section of Examples.

[Drying Treatment]

In the present invention, it is preferred that the cellulose-containing raw material, preferably the cellulose-containing raw material obtained through the aforementioned cutting treatment and/or coarse pulverization treatment, is subjected to a drying treatment before the decrystallization treatment.

In general, cellulose-containing raw materials which are generally usable, such as commercially available pulp, and biomass resources, e.g., paper, wood, plant stem, leaf, and husk, contains moisture in an amount exceeding 5% by mass, typically about 5 to 30% by mass.

In consequence, in the present invention, it is preferred to adjust the moisture content of the cellulose-containing raw material to 10% by mass or less through a drying treatment.

The drying method may be appropriately selected from known drying means. Examples thereof include a hot air heating drying method, a conduction heating drying method, a dehumidified air drying method, a chilled air drying method, a microwave drying method, an infrared drying method, a sun drying method, a vacuum drying method, and a freeze drying method.

In the aforementioned drying methods, a known dryer can be appropriately selected and used. Examples thereof include a dryer described in "Outline of Particle Technology" (edited by The Association of Powder Process Industry and Engineering, JAPAN, published by The Information Center of Particle Technology, Japan (1995), page 176).

These drying methods or dryers may be employed alone or in combination of two or more thereof. Although any of a batch treatment and a continuous treatment may be adopted for the drying treatment, from the viewpoint of productivity, a continuous treatment is preferred.

From the viewpoint of thermal conduction efficiency, the continuous dryer is preferably a horizontal agitation dryer of a conduction heating type. Furthermore, from the viewpoint of preventing micro-dust and attaining stability of continuous discharge, a twin-screw horizontal agitation dryer is preferred. As the twin-screw horizontal agitation dryer, a twin-screw paddle dryer, manufactured by Nara Machinery Co., Ltd. can be preferably used.

Although a temperature in the drying treatment cannot be unequivocally determined depending upon the drying means, drying time, etc., from the viewpoint of rutting resistance and cracking resistance, it is preferably 10° C. or higher, more preferably 25° C. or higher, and still more preferably 50° C. or higher, and it is preferably 250° C. or lower, more preferably 180° C. or lower, and still more preferably 150° C. or lower. From the viewpoint of rutting resistance and cracking resistance, a treatment time is preferably 0.01 hour or more, and more preferably 0.02 hours or more, and it is preferably 2 hours or less, and more preferably 1 hour or less. If desired, the drying treatment may be performed under reduced pressure. The pressure is preferably 1 kPa or more, and more preferably 50 kPa or more, and it is preferably 120 kPa or less, and more preferably 105 kPa or less.

[Decrystallization Treatment]

A medium-type pulverizer can be preferably used as the pulverizer that is used for the decrystallization treatment. The medium-type pulverizer is classified into a container driving-type pulverizer and a medium agitating-type pulverizer.

Examples of the container driving-type pulverizer include a tumbling mill, a vibration mill, a planetary mill, and a centrifugal fluid mill. Of these, a vibration mill is preferred from the viewpoint of high pulverization efficiency and productivity.

Examples of the medium agitating-type pulverizer include a tower-type pulverizer, such as a tower mill; an agitation tank-type pulverizer, such as an Attritor, an Aquamizer, and a Sand grinder; a flow tank-type pulverizer, such as a Visco mill and a Pearl mill; a flow tube-type pulverizer; an annular-type pulverizer, such as a co-ball mill; and a continuous-type dynamic pulverizer. Of these, an agitation tank-type pulverizer is preferred from the viewpoint of high pulverization efficiency and productivity. In the case of using a medium agitating-type pulverizer, from the viewpoint of rutting resistance and cracking resistance, a peripheral speed of the tip of agitation blades thereof is preferably 0.5 m/s or more, and more preferably 1 m/s or more, and it is preferably 20 m/s or less, and more preferably 15 m/s or less.

As for the type of the pulverizer, "Progress of Chemical Engineering, 30th Collection, Control of Microp article", Institute of Chemical Engineering, Tokai Division, Oct. 10, 1996, Maki-Shoten) can be made by reference.

Although the treatment method may be either a batch treatment or a continuous treatment, from the viewpoint of productivity, a continuous treatment is preferred.

Examples of the medium of the pulverizer include a ball, a rod, and a tube. Of these, from the viewpoint of high pulverization efficiency and productivity, a ball and a rod are preferred, with a rod being more preferred.

The material of the medium of the pulverizer is not particularly limited, and examples thereof include iron, stainless steel, alumina, zirconia, silicon carbide, silicon nitride, and glass.

In the case where the pulverizer is a vibration mill, and the medium is a ball, from the viewpoint of rutting resistance and cracking resistance, an outer diameter of the ball is preferably 0.1 mm or more, and more preferably 0.5 mm or more, and it is preferably 100 mm or less, and more preferably 50 mm or less. When the size of the ball falls within the aforementioned range, not only a desired pulverization force is attained, but also the cellulose can be efficiently decrystallized without contamination of the cellulose-containing raw material to be caused due to inclusion of a fragment of the ball or the like.

In the present invention, the cellulose in the raw material can be efficiently decrystallized through a pulverization treatment with a vibration mill having a rod filled therein, and hence, such is suitable.

Examples of the vibration mill include a Vibro mill, manufactured by Uras Techno Co., Ltd.; a vibration mill, manufactured by Chuo Kakohki Co., Ltd.; a small-size vibration rod mill "model 1045", manufactured by Yoshida Seisakusho Co., Ltd.; a vibration cup mill "model P-9", manufactured by Fritsch Inc., in Germany; and a small-size vibration mill "model NB-O", manufactured by Nitto Kagaku Co., Ltd.

The rod that is used as the medium in the pulverizer is a rod-form medium, and rods having a cross section, such as a polygonal shape, e.g., a square shape and a hexagonal shape, a circular shape, and an elliptical shape, can be used.

From the viewpoint of rutting resistance and cracking resistance, an outer diameter of the rod is preferably 0.5 mm or more, more preferably 1 mm or more, and still more preferably 5 mm or more, and it is preferably 200 mm or less, more preferably 100 mm or less, and still more preferably 50 mm or less. A length of the rod is not particularly limited so long as it is shorter than the length of the container of the pulverizer. When the size of the rod falls within the aforementioned range, not only a desired pulverization force is obtained, but also the cellulose can be efficiently decrystallized without contamination of the cellulose-containing raw material to be caused due to inclusion of a fragment of the rod or the like.

Although a filling ratio of the medium, such as a ball and a rod, varies in terms of a suitable range thereof depending upon the type of the pulverizer, from the viewpoint of rutting resistance and cracking resistance, it is preferably 10% or more, and more preferably 15% or more, and it is preferably 97% or less, and more preferably 95% or less. When the filling ratio falls within the aforementioned range, not only the frequency of contact between the cellulose-containing raw material and the medium can be increased, but also the pulverization efficiency can be improved without inhibiting the motion of the medium. The "filling ratio" as referred to herein means an apparent volume of the medium relative to a capacity of the agitation section of the pulverizer.

Although a treatment time of the pulverizer cannot be unequivocally determined due to the variation of the type of the pulverizer, the type, size, filling ratio, etc. of the medium, such as a ball and a rod, from the viewpoint of reducing the crystallization index and also rutting resistance and cracking resistance, it is preferably 0.5 minutes or more, more preferably 2 minutes or more, sill more preferably 3 minutes or more, yet still more preferably 4 minutes or more, and even yet still more preferably 5 minutes or more, and it is preferably 24 hours or less, more preferably 12 hours or less, still more preferably 6 hours or less, yet still more preferably 1 hour or less, and even yet still more preferably 40 minutes or less.

Although a treatment temperature is not particularly limited, from the viewpoint of preventing the deterioration of cellulose to be caused due to heat, it is preferably 5° C. or higher, and more preferably 10° C. or higher, and it is preferably 250° C. or lower, and more preferably 200° C. or lower.

[Particle Diameter Reduction Treatment]

In the present invention, if desired, the amorphous cellulose obtained through the decrystallization treatment may be further subjected to a particle diameter reduction treatment. The particle diameter reduction treatment can be performed by appropriately selecting and using a known pulverizer, and examples of the pulverizer include those described in "Handbook of Chemical Engineering, revised 6th edition" (edited by The Society of Chemical Engineers, Japan, published by Maruzen Co., Ltd. (1999), page 843).

These pulverizers may be used alone or in combination of two or more thereof. Although the particle diameter reduction treatment may be either a batch treatment or a continuous treatment, a continuous treatment is preferred from the viewpoint of productivity.

From the viewpoint of high pulverization efficiency and reduction of the particle diameter and also rutting resistance and cracking resistance, the pulverizer is preferably a high-speed rotary mill, and more preferably a turbo-type mill and an annular-type mill. As the turbo-type mill, a turbo mill, manufactured by Turbo Corporation can be preferably used. As the annular-type mill, Kryptron Series, manufactured by EARTHTECHNICA Co., Ltd. can be preferably used.

As the method of particle diameter reduction treatment, a method in which the amorphous cellulose obtained through the decrystallization treatment is charged in the pulverizer and continuously processed is preferred. From the viewpoint of obtaining the amorphous cellulose having a small particle diameter and appropriately modifying it and also rutting resistance and cracking resistance, a peripheral speed of a rotor of the high-speed rotary mill is preferably 50 m/s or more, and more preferably 100 m/s or more. Although other treatment conditions are not particularly limited, a treatment temperature is preferably 5° C. or higher and 200° C. or lower.

[Classification Treatment]

In the present invention, if desired, the amorphous cellulose obtained through the decrystallization treatment can be further subjected to a classification treatment. The amorphous cellulose having a desired particle diameter can be obtained through the treatment with classifier. The classification treatment method may be performed through a technique appropriately selected from known dry classification means, and examples thereof include sieving and pneumatic classification.

By again charging a coarse powder after the classification treatment together with the cellulose-containing raw material in the vibration mill and perform the decrystallization treatment, an amorphous cellulose having a small particle diameter can be efficiently obtained.

Thus, cellulose (amorphous cellulose) having a crystallization index of 50% or less is obtained.

Although the thus obtained cellulose is decrystallized to an extent that the crystallization index is 50% or less, from the viewpoint of improvement in viscoelasticity of the asphalt composition and the viewpoint of handling properties, rutting resistance, and cracking resistance, the median diameter (volume medial particle diameter) is preferably 200 µm or less, more preferably 150 µm or less, still more preferably 100 µm or less, and yet still more preferably 80 µm or less, and it is preferably 1 µm or more, more preferably 3 µm or more, still more preferably 5 µm or more, and yet still more preferably 10 µm or more.

In the case where the amorphous cellulose is cellulose subjected to a surface hydrophobization treatment as mentioned later, the median diameter of the cellulose means a median diameter of the amorphous cellulose after the surface hydrophobization treatment, and a preferred range thereof is the same.

In the present invention, from the viewpoint of rutting resistance and cracking resistance, the amorphous cellulose is preferably cellulose having been subjected to a surface hydrophobization treatment with a surface hydrophobizing agent (hereinafter also referred to as "modifier"). Although the hydrophobizing agent for performing the surface hydrophobization treatment is not particularly limited, examples thereof include a silane-based coupling agent, a titanate-based coupling agent, an aluminum-based coupling agent, a silicon oil, a fluorine oil, a silicon resin, a fluorine resin, an acrylic resin, a polymer having a polar group and a polyolefin chain, a polymer having a polar group and a polystyrene chain, and a saturated aliphatic compound having a polar group.

Examples of the silane-based coupling agent include trimethyl methoxysilane, dimethyl methoxysilane, methyl trimethoxysilane, methyl triethoxysilane, vinyl trimethoxysilane, γ-aminopropyl triethoxysilane, and fluoromethyl trimethoxysilane.

Examples of the titanate-based coupling agent include isopropyl triisostearoyl titanate, isopropyl tris(dioctyl pyrophosphate) titanate, isopropyl tris(N-aminoethyl-aminoethyl) titanate, and bis(dioctyl pyrophosphate) ethylene titanate.

Examples of the aluminum-based coupling agent include ethyl acetoacetate aluminum diisopropylate, aluminum tris (ethyl acetoacetate), an alkyl acetoacetate aluminum diisopropylate, aluminum monoacetyl acetate bis(ethyl acetoacetate), and aluminum tris(acetyl acetate).

Examples of the polar group in the polymer having a polar group and a polyolefin chain include an organic isocyanate group, an (anhydrous) carboxylic acid group, a carboxylic acid halide group, an amino group, a hydroxy group, and an epoxy group. Of these, from the viewpoint of enhancing an affinity with the amorphous cellulose, an (anhydrous) carboxylic acid group and an epoxy group are preferred, and an (anhydrous) carboxylic acid group is more preferred. The "(anhydrous) carboxylic acid group" is a general term of a carboxylic anhydride group and a carboxylic acid group (carboxy group). Specifically, examples thereof include polar groups derived from maleic anhydride, maleic acid, or glycidyl (meth)acrylate.

Preferred examples of the polyolefin chain include polymer chains derived from an ethylene-based polymer (for example, high-density polyethylene, medium-density polyethylene, low-density polyethylene, and a copolymer of ethylene and at least one other vinyl compound (for example, an α-olefin, vinyl acetate, methacrylic acid, and acrylic acid)), a propylene-based polymer (for example, polypropylene and a copolymer of propylene and at least one other vinyl compound), an ethylene/propylene copolymer, polybutene, or poly-4-methylpentene-1. Polymer chains derived from an ethylene-based polymer or a propylene-based polymer are more preferred.

Examples of the polymer having a polar group and a polyolefin chain include a maleic anhydride-modified polyolefin.

As the polymer having a polar group and a polyolefin chain, commercially available products may be used. Suitable examples of the commercially available product include "BONDFAST 7M" (a copolymer of ethylene and glycidyl methacrylate), manufactured by Sumitomo Chemical Co., Ltd.; "REXPEARL ET Series" (a copolymer of ethylene, (meth)acrylic acid and/or its ester, and maleic anhydride), manufactured by Japan Polyethylene Corporation; "MODIPER A4000 Series" (a graft copolymer in which a main chain thereof is a copolymer of ethylene and glycidyl methacrylate), manufactured by NOF Corporation; "UMEX" (maleic anhydride-modified polypropylene), manufactured by Sanyo Chemical Industries, Ltd.; "OREVAC" (maleic anhydride-modified polyethylene, maleic anhydride-modified polypropylene), manufactured by Arkema Inc.; "LOTADER" (a copolymer of ethylene, an acrylic acid ester, and glycidyl methacrylate), manufactured by Arkema Inc.; "BONDINE" (a copolymer of ethylene, an acrylic acid ester, and maleic anhydride), manufactured by Arkema Inc.; "KAYABRID" (maleic anhydride-modified polypropylene), manufactured by Kayaku Akzo Co., Ltd.; "NUCREL" (a copolymer of ethylene and methacrylic acid), manufactured by Du Pont-Mitsui Polychemicals Co., Ltd.; and "PRIMACOR" (a copolymer of ethylene and acrylic acid), manufactured by The Dow Chemical Company.

In the polymer having a polar group and a polyolefin chain, in view of the fact that the polyolefin chain moiety thereof has an affinity with the asphalt, whereas the polar chain moiety thereof interacts with the amorphous cellulose to reveal an affinity, it may be considered that an affinity between the amorphous cellulose and the asphalt is improved, and the viscoelasticity of the asphalt composition is improved.

Examples of the polymer having a polar group and a polystyrene chain include a maleic anhydride-modified polystyrene.

As the polymer having a polar group and a polystyrene chain, commercially available products may be used. Suitable examples of the commercially available product include "SMA" (styrene-maleic acid copolymer), manufactured by Cray Valley and "ARASTAR" (styrene-maleic acid copolymer), manufactured by Arakawa Chemical Industries, Ltd.

Examples of the saturated or unsaturated aliphatic compound having a polar group include succinic acid, maleic acid, lauric acid, myristic acid, pentadecylic acid, palmitic acid, margaric acid, and stearic acid.

Among these, from the viewpoint of rutting resistance and cracking resistance, the surface hydrophobizing agent is preferably at least one selected from the group consisting of a silane-based coupling agent, a titanate-based coupling agent, an aluminum-based coupling agent, a polymer having a polar group and a polyolefin chain or a polystyrene chain, and a saturated aliphatic compound having a polar group; more preferably a polymer having a polar group and a polyolefin chain or a polystyrene chain; still more preferably a malic anhydride-modified polyolefin; yet still more preferably at least one selected from a maleic anhydride-modified polyethylene and a maleic anhydride-modified polypropylene; even yet still more preferably a maleic anhydride-modified polyethylene or a maleic anhydride-modified polypropylene; and even still more preferably a maleic anhydride-modified polypropylene.

From the viewpoint of enhancing an affinity between the amorphous cellulose and the asphalt and also rutting resistance and cracking resistance, a weight average molecular weight of the maleic anhydride-modified polyolefin, preferably the maleic anhydride-modified polyethylene and the maleic anhydride-modified polypropylene is preferably 1,000 or more, more preferably 5,000 or more, still more preferably 10,000 or more, and yet still more preferably 30,000 or more, and it is preferably 1,000,000 or less, more preferably 500,000 or less, still more preferably 300,000 or less, and yet still more preferably 100,000 or less.

From the viewpoint of enhancing an affinity between the amorphous cellulose and the asphalt and also rutting resistance and cracking resistance, an acid value of the maleic anhydride-modified polyolefin, preferably the maleic anhydride-modified polyethylene and the maleic anhydride-modified polypropylene is preferably 1 mgKOH/g or more, more preferably 2 mgKOH/g or more, still more preferably 3 mgKOH/g or more, yet still more preferably 5 mgKOH/g or more, and even yet still more preferably 10 mgKOH/g or more, and it is preferably 200 mgKOH/g or less, more preferably 100 mgKOH/g or less, still more preferably 60 mgKOH/g or less, and yet still more preferably 30 mgKOH/g or less.

From the viewpoint of improving the viscoelasticity of the asphalt composition and also rutting resistance and cracking resistance, the treatment amount with the surface hydrophobizing agent is preferably 1 part by mass or more, more preferably 3 parts by mass or more, still more preferably 5 parts by mass or more, yet still more preferably 10 parts by mass or more, and even yet still more preferably 20 parts by mass or more, and it is preferably 100 parts by mass or less, more preferably 80 parts by mass or less, still more preferably 60 parts by mass or less, yet still more preferably 40 parts by mass or less, and even yet still more preferably 30 parts by mass or less, based on 100 parts by mass of the untreated amorphous cellulose.

Although the surface hydrophobization treatment method of the amorphous cellulose is not particularly limited, from the viewpoint of rutting resistance and cracking resistance, it is preferably a method in which the surface hydrophobizing agent is added together with the cellulose in the pulverizer during the aforementioned decrystallization treatment, thereby mixing and pulverizing the contents. That is, it is preferred to produce the surface-hydrophobized cellulose by adding the surface hydrophobizing agent to cellulose having a crystallization index of more than 50%, followed by mixing and pulverizing, thereby controlling the crystallization index to 50% or less.

The surface hydrophobization treatment method is not limited thereto, and the surface treatment may be performed by agitating and mixing the cellulose together with the surface hydrophobizing agent in a water-soluble organic solvent. Examples of the water-soluble organic solvent include methyl alcohol, ethyl alcohol, propyl alcohol, isopropyl alcohol, and acetone.

In the asphalt composition of the present invention, the content or blending amount of the cellulose is preferably 0.01 parts by mass or more and 10 parts by mass or less based on 100 parts by mass of the asphalt. When the content of the cellulose is 0.01 parts by mass or more, an improving effect for rutting resistance or cracking resistance is high. On the other hand, when the content of the cellulose is 10 parts by mass or less, such is preferred from the viewpoint of costs. The improvement for rutting resistance or cracking resistance means inhibition of the occurrence of rutting or cracking. Hereunder, the same is applicable.

From the viewpoint of rutting resistance and cracking resistance, the content of the cellulose is preferably 0.03 parts by mass or more, more preferably 0.1 parts by mass or more, still more preferably 0.3 parts by mass or more, yet still more preferably 1 part by mass or more, and even yet still more preferably 2 parts by mass or more, and from the viewpoint of workability, it is more preferably 8 parts by mass or less, still more preferably 6 parts by mass or less, and yet still more preferably 4 parts by mass or less, based on 100 parts by mass of the asphalt.

In the case where the asphalt is a polymer-modified asphalt, the mass of the asphalt means a mass of the whole of asphalt including the straight asphalt and the modifier. Similarly, in the case where the cellulose is a surface-hydrophobized cellulose, the mass of the cellulose means a mass of the whole of cellulose including the cellulose main body and the surface hydrophobizing agent.

<Polyester>

The asphalt composition of the present invention contains a polyester. From the viewpoint of more improving the rutting resistance and the cracking resistance of the pavement surface after laying, the polyester preferably contains an alcohol component-derived structural unit containing 60 mol % or more of an alkylene oxide adduct of bisphenol A and a carboxylic acid component-derived structural unit.

(Alcohol Component)

Examples of the alcohol component include diols and trihydric or higher polyhydric alcohols. Examples of the diol include an aliphatic diol and an aromatic diol. These alcohol components can be used alone or in combination of two or more thereof.

From the viewpoint of obtaining excellent rutting resistance and cracking resistance, the alcohol component preferably includes an alkylene adduct of bisphenol A, and more preferably includes an alkylene oxide adduct of bisphenol A represented by the following formula (I):

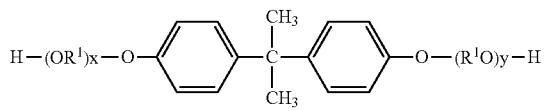

(I)

wherein $OR^1$ and $R^1O$ are each an alkylene oxide; $R^1$ is an alkylene group having 2 or 3 carbon atoms; x and y are each a positive number expressing an average addition molar number of an alkylene oxide; and a sum of x and y is preferably 1 or more, and more preferably 1.5 or more, and it is preferably 16 or less, more preferably 8 or less, and still more preferably 4 or less.

Examples of the alkylene oxide adduct of bisphenol A represented by the formula (I) include a propylene oxide adduct of bisphenol A [2,2-bis(4-hydroxyphenyl)propane] and an ethylene oxide of bisphenol A. These alkylene oxide adducts of bisphenol A can be used alone or in combination of two or more thereof.

From the viewpoint of not only enhancing the melt dispersibility in the asphalt but also obtaining excellent rutting resistance and cracking resistance, the use amount of the alkylene oxide adduct of bisphenol A is preferably 60 mol % or more, more preferably 75 mol % or more, and still more preferably 90 mol % or more, and it is 100 mol % or less, in 100 mol % of the alcohol component.

Examples of the aliphatic diol include ethylene glycol, 1,2-propanediol, 1,3-propanediol, 1,3-butanediol, 1,4-butanediol, 1,4-butenediol, 1,5-pentanediol, 1,6-hexanediol, neopentyl glycol, 1,10-decanediol, and 1,12-dodecanediol.

The trihydric or higher polyhydric alcohol is, for example, a trihydric alcohol. Examples of the trihydric or higher polyhydric alcohol include glycerin.

(Carboxylic Acid Component)

Examples of the carboxylic acid component include an aliphatic dicarboxylic acid compound, an aromatic dicarboxylic acid, and a trivalent or more and hexavalent or less polyvalent carboxylic acid compound. These carboxylic acid components can be used alone or in combination of two or more thereof.

From the viewpoint of more improving the rutting resistance and the cracking resistance, the carbon number of the main chain of the aliphatic dicarboxylic acid is preferably 3 or more, and more preferably 4 or more, and it is preferably 10 or less, and more preferably 8 or less.

Examples of the aliphatic dicarboxylic acid compound include fumaric acid, maleic acid, oxalic acid, malonic acid, citraconic acid, itaconic acid, glutaconic acid, succinic acid, adipic acid, suberic acid, azelaic acid, sebacic acid, dodecane diacid, and a succinic acid substituted with an alkyl group having 1 or more and 20 or less carbon atoms or an alkenyl group having 2 or more and 20 or less carbon atoms; or anhydrides thereof and alkyl esters thereof (for example, the carbon number of the alkyl group is 1 or more and 3 or less). Examples of the substituted succinic acid include dodecylsuccinic acid, dodecenylsuccinic acid, and octenylsuccinic acid. Of the foregoing aliphatic dicarboxylic acid compounds, at least one selected from the group consisting of fumaric acid, maleic aid, and adipic acid is preferred, and adipic acid is more preferred.

Examples of the aromatic dicarboxylic acid compound include phthalic acid, isophthalic acid, terephthalic acid, and naphthalenedicarboxylic acid; or anhydrides thereof and alkyl esters thereof (for example, the carbon number of the alkyl group is 1 or more and 3 or less). From the viewpoint of rutting resistance and cracking resistance, among the foregoing aromatic dicarboxylic acid compounds, isophthalic acid and terephthalic acid are preferred, and terephthalic acid is more preferred.

The trivalent or more and hexavalent or less polyvalent carboxylic acid is preferably a trivalent carboxylic acid. Examples of the trivalent or more and hexavalent or less polyvalent carboxylic acid include trimellitic acid, 2,5,7-naphthalenetricarboxylic acid, and pyromellitic acid. In the case where a polyvalent carboxylic acid is included, from the viewpoint of regulating the properties, a monohydric alcohol may be appropriately contained in the alcohol component, and a monovalent carboxylic acid compound may be appropriately contained in the carboxylic acid component.

From the viewpoint of increasing the flexibility of the polyester and more improving the rutting resistance and the cracking resistance, the content of the aliphatic dicarboxylic acid compound in the carboxylic acid component is preferably 1 mol % or more, more preferably 5 mol % or more, and still more preferably 10 mol % or more, and it is preferably 40 mol % or less, and more preferably 25 mol % or less.

From the viewpoint of not only enhancing the melt dispersibility in the asphalt but also obtaining excellent rutting resistance and cracking resistance, the content of the aromatic dicarboxylic acid compound is preferably 60 mol % or more, and more preferably 75 mol % or more, and it is preferably 99 mol % or less, more preferably 95 mol % or less, and still more preferably 90 mol % or less, in 100 mol % of the carboxylic acid component.

(Molar Ratio of Carboxylic Acid Component-Derived Structural Unit to Alcohol Component-Derived Structural Unit)

From the viewpoint of regulating the acid value, a molar ratio of the carboxylic acid component-derived structural unit to the alcohol component-derived structural unit [(carboxylic acid component)/(alcohol component)] is preferably 0.7 or more, and more preferably 0.8 or more, and it is preferably 1.5 or less, more preferably 1.3 or less, and still more preferably 1.1 or less.

(Properties of Polyester)

From the viewpoint of obtaining the rutting resistance and the cracking resistance, a softening point of the polyester is preferably 90° C. or higher, more preferably 95° C. or higher, and still more preferably 100° C. or higher, and it is preferably 140° C. or lower, more preferably 130° C. or lower, still more preferably 125° C. or lower, yet still more preferably 120° C. or lower, and even yet still more preferably 115° C. or lower.

From the viewpoint of promoting the adsorption onto the aggregate and more improving the rutting resistance and the cracking resistance, an acid value of the polyester is preferably 2 mgKOH/g or more, more preferably 3 mgKOH/g or more, and still more preferably 4 mgKOH/g or more, and from the viewpoint of enhancing the water resistance on the pavement surface, it is preferably 30 mgKOH/g or less, more preferably 20 mgKOH/g or less, and still more preferably 18 mgKOH/g or less.

From the viewpoint of more improving the rutting resistance and the cracking resistance, a hydroxyl value of the polyester is preferably 1 mgKOH/g or more, more preferably 2 mgKOH/g or more, still more preferably 5 mgKOH/g or more, and yet still more preferably 10 mgKOH/g or more, and it is preferably 70 mgKOH/g or less, more preferably 50 mgKOH/g or less, still more preferably 30 mgKOH/g or less, and yet still more preferably 25 mgKOH/g or less.

From the viewpoint of obtaining the rutting resistance and the cracking resistance and the viewpoint of improving the flow resistance at a high temperature, a glass transition point of the polyester is preferably 40° C. or higher, and more preferably 45° C. or higher, and it is preferably 80° C. or lower, more preferably 75° C. or lower, and still more preferably 70° C. or lower.

The softening point, the acid value, the hydroxyl value, and the glass transition point can be measured by the methods described in the section of Examples. The softening point, the acid value, the hydroxyl value, and the glass transition point can be controlled by a raw material monomer composition, a molecular weight, a catalyst amount, or reaction conditions.

(Production Method of Polyester)

Although a method for producing the polyester resin is not particularly limited, for example, the polyester resin can be produced by subjecting the alcohol component and the carboxylic acid component as mentioned above to polycondensation.

Although a temperature of the polycondensation reaction is not particularly limited, from the viewpoint of reactivity, it is preferably 160° C. or higher and 260° C. or lower.

For the polycondensation reaction, from the viewpoint of rutting resistance and cracking resistance, a tin(II) compound not having an Sn-C bond, such as tin(II) di(2-ethylhexanoate), may be used as a catalyst in an amount of preferably 0.01 parts by mass or more, and more preferably 0.2 parts by mass or more, and it is preferably 1.5 parts by mass or less, and more preferably 0.6 parts by mass or less, based on 100 parts by mass of the total amount of the alcohol component and the carboxylic acid component.

For the polycondensation reaction, from the viewpoint of rutting resistance and cracking resistance, in addition to the catalyst, a pyrogallol compound, such as gallic acid, may be used as an esterification catalyst in an amount of preferably 0.001 parts by mass or more, more preferably 0.005 parts by mass or more, and still more preferably 0.01 parts by mass or more, and it is preferably 0.15 parts by mass or less, more preferably 0.10 parts by mass or less, and still more preferably 0.05 parts by mass or less, based on 100 parts by mass of the total amount of the alcohol component and the carboxylic acid component.

(Ratio of Polyester)

In the asphalt composition of the present invention, from the viewpoint of improving the rutting resistance and the cracking resistance, a ratio of the polyester is preferably 2 parts by mass or more, more preferably 5 parts by mass or more, and still more preferably 10 parts by mass or more, and from the viewpoint of workability, it is preferably 30 parts by mass or less, and more preferably 25 parts by mass or less, based on 100 parts by mass of the asphalt.

From the viewpoint of improving the rutting resistance and the cracking resistance, the asphalt composition of the present invention is preferably a combination of:
asphalt;
cellulose having a crystallization index of 50% or less and having been subjected to a surface hydrophobization treatment with maleic anhydride-modified polypropylene; and
a polyester containing an alcohol component-derived structural unit containing 60 mol % or more of an alkylene oxide adduct of bisphenol A and a terephthalic acid component-derived structural unit.

<Additives>

To the asphalt composition of the present invention, in addition to the asphalt, the cellulose, and the polyester as mentioned above, various additives which are conventionally commonly used for asphalt compositions, such as a film-forming agent, a thickening stabilizer, and an emulsifier, may be added, as the need arises.

Specifically, examples thereof include fillers and reinforcing agents, such as calcium carbonate, a mineral substance powder, and a glass fiber; aggregates of a mineral substance; pigments, such as red iron oxide and titanium dioxide; waxes, such as a paraffin wax, a microcrystalline wax, and a low-molecular weight polyethylene wax; foaming agents, such as azodicarbonamide; polyolefin-based or low-molecular weight vinyl aromatic thermoplastic resins, such as atactic polypropylene and an ethylene-ethyl acrylate copolymer; natural rubbers; and synthetic rubbers, such as a polyisoprene rubber, a polybutadiene rubber, a styrene-butadiene rubber, an ethylene-propylene rubber, a chloroprene rubber, an acrylic rubber, an isoprene-isobutylene rubber, a polypentenamer rubber, a styrene-butadiene-based block copolymer, a styrene-isoprene-based block copolymer, a hydrogenated styrene-butadiene-based block copolymer, and a hydrogenated styrene-isoprene-based block copolymer.

The total addition amount of these additives is preferably 50% by mass or less, more preferably 30% by mass or less, still more preferably 20% by mass or less, yet still more preferably 10% by mass or less, and even yet still more preferably 5% by mass or less relative to the whole of the asphalt composition.

[Production Method of Asphalt Composition]

A method for producing the asphalt composition of the present invention includes a step of mixing asphalt, cellulose (preferably an amorphous cellulose), and a polyester.

The asphalt composition is obtained by heat-melting asphalt, adding cellulose (preferably an amorphous cellulose), and a polyester, and optionally other additive, and agitating and mixing the contents in a generally used mixing machine until the respective components are uniformly dispersed. Examples of the generally used mixing machine include a homomixer, a dissolver, a puddle mixer, a ribbon mixer, a screw mixer, a planetary mixer, a vacuum counter-flow mixer, a roll mill, and a twin-screw extruder.

From the viewpoint of uniformly dispersing the amorphous cellulose and the polyester in the asphalt and also rutting resistance and cracking resistance, a mixing temperature of the asphalt, the cellulose, and the polyester as mentioned above is preferably 100° C. or higher, more preferably 130° C. or higher, still more preferably 160° C. or higher, and yet still more preferably 170° C. or higher, and it is preferably 230° C. or lower, more preferably 210° C. or lower, still more preferably 200° C. or lower, and yet still more preferably 190° C. or lower.

From the viewpoint of efficiently uniformly dispersing the amorphous cellulose and the polyester in the asphalt and also rutting resistance and cracking resistance, a mixing time of the asphalt, the cellulose, and the polyester is preferably 0.1 hours or more, more preferably 0.5 hours or more, still more preferably 1.0 hour or more, and yet still more preferably 1.5 hours or more, and it is preferably 10 hours or less, more preferably 7 hours or less, still more preferably 5 hours or less, and yet still more preferably 3 hours or less.

The preferred content of the cellulose and the polyester relative to the asphalt is one as mentioned above.

As mentioned above, the cellulose that is used for the asphalt composition of the present invention and the production method of the same is preferably an amorphous cellulose having a crystallization index of 50% or less, and preferably a surface-hydrophobized cellulose. In addition, it is preferred that the surface-hydrophobized cellulose is produced through a step of adding a surface hydrophobizing agent to cellulose having a crystallization index of more than 50%, followed by mixing and pulverizing, thereby controlling the crystallization index to 50% or less.

[Asphalt Mixture and Production Method of Same]

The asphalt composition of the present invention is a binder composition and is used for pavement after adding an aggregate thereto to provide an asphalt mixture. That is, the asphalt composition of the present invention is suitable for pavement, and especially suitable for road pavement.

The aggregate can be, for example, optionally selected from crushed stone, cobble stone, gravel, sand, reclaimed aggregate, and ceramics, and used.

As the aggregate, all of a coarse aggregate having a particle diameter of 2.36 mm or more and a fine aggregate having a particle diameter of less than 2.36 mm can be used. Examples of the coarse aggregate include No. 7 crushed stone having a particle diameter range of 2.36 mm or more and less than 4.75 mm, No. 6 crushed stone having a particle diameter range of 4.75 mm or more and less than 13.2 mm, No. 5 crushed stone having a particle diameter range of 13.2 mm or more and less than 19 mm, and No. 4 crushed stone having a particle diameter range of 19 mm or more and less than 31.5 mm.

The fine aggregate is preferably a fine aggregate having a particle diameter of 0.075 mm or more and less than 2.36 mm. Examples of the fine aggregate include river sand, hill sand, mountain sand, sea sand, crushed sand, fine sand, screenings, crushed stone dust, silica sand, artificial sand, glass cullet, molding sand, and reclaimed aggregate-crushed sand.

The aforementioned particle diameter is a value prescribed in JIS 5001-1995.

Of these, a combination of the coarse aggregate and the fine aggregate is preferred.

The fine aggregate may contain a filler having a particle diameter of less than 0.075 mm (for example, sand). A lower limit value of the average particle diameter of the filler is, for example, 0.001 mm or more.

From the viewpoint of improving the dry strength and the viewpoint of rutting resistance and cracking resistance, the average particle diameter of the filler is preferably 0.001 mm or more, and from the same viewpoints, it is preferably 0.05 mm or less, more preferably 0.03 mm or less, and still more preferably 0.02 mm or less. The average particle diameter of the filler can be measured by a laser diffraction particle size distribution analyzer. Here, the average particle diameter means an average particle diameter of 50% cumulative volume.

[Measurement Method of Average Particle Diameter of Filler]

The average particle diameter of the filler is a value measured by a laser diffraction particle size distribution analyzer ("LA-950", manufactured by HORIBA, Ltd.) with the following conditions.

Measurement method: Flow method
Dispersion medium: Ethanol
Sample preparation: 2 mg/100 mL
Dispersing method: Stirring and 1 minute of built-in ultrasonic waves Examples of the filler include sand, fly ash, calcium carbonate, and hydrated lime. Of these, calcium carbonate is preferred from the viewpoint of improving the dry strength and the viewpoint of rutting resistance and cracking resistance.

From the viewpoint of rutting resistance and cracking resistance, a mass ratio of the coarse aggregate to the fine aggregate is preferably 10/90 or more, more preferably 20/80 or more, and still more preferably 30/70 or more, and it is preferably 90/10 or less, more preferably 80/20 or less, and still more preferably 70/30 or less.

The content of the aggregate is preferably 1,000 parts by mass or more, more preferably 1,200 parts by mass or more, and still more preferably 1,500 parts by mass or more, and it is preferably 3,000 parts by mass or less, more preferably 2,500 parts by mass or less, and still more preferably 2,000 parts by mass or less, based on 100 parts by mass of the asphalt composition.

The blending ratio of asphalt in the conventional asphalt mixtures containing the aggregate and the asphalt may be in general determined by referring to an optimum asphalt amount obtained from "Formulation and Design of Asphalt Mixture" as described in "Guideline for Pavement Design and Construction" published by Japan Road Association.

In the present invention, the aforementioned optimum asphalt amount corresponds to the total amount of the asphalt, the cellulose, and the polyester. In consequence, in general, the total blending amount of the asphalt, the cellulose, and the polyester is preferably determined from the aforementioned optimum asphalt amount.

However, it is not needed to limit the optimum asphalt amount to the method as described in "Guideline for Pavement Design and Construction", and it may also be determined by any other methods.

The asphalt mixture of the present invention may be used as a heated asphalt mixture not substantially containing water, or may also be used as a cold asphalt mixture obtained by blending the aforementioned asphalt mixture with an emulsifier or water to provide an asphalt emulsion, with which is then blended an aggregate or the like.

In particular, the asphalt composition of the present invention has such properties that the cellulose is apt to be uniformly dispersed in the asphalt composition. Therefore, when used as a heated asphalt mixture, it is able to effectively exhibit its characteristic features.

In the case of using the asphalt mixture as a heated asphalt mixture, a method for producing the asphalt mixture is not particularly limited, and the asphalt mixture may be produced by any methods. However, in general, the asphalt mixture may be produced according to any method for producing an asphalt mixture containing an aggregate and an asphalt composition.

The method for producing the asphalt mixture of the present invention preferably includes a step of preparing an asphalt composition having asphalt, cellulose, and a polyester and mixing an aggregate therewith at 130° C. or higher and 200° C. or lower.

From the viewpoint of softening the asphalt and also rutting resistance and cracking resistance, a mixing temperature is preferably 140° C. or higher, and it is preferably 190° C. or lower, and more preferably 180° C. or lower.

From the viewpoint of rutting resistance and cracking resistance, a mixing time is preferably 30 seconds or more, more preferably 1 minute or more, still more preferably 2 minutes or more, and yet still more preferably 5 minutes or more. Although an upper limit of the mixing time is not particularly limited, it is, for example, about 30 minutes.

Examples of the specific production method of the asphalt mixture include a production method of the asphalt mixture which is called as a conventional plant mix method or premix method or the like. All of these methods are a method of adding the asphalt (and optionally, the thermoplastic elastomer), the polyester, and the cellulose to the heated aggregate. Examples of the addition method include a premix method in which the asphalt (and optionally, the thermoplastic elastomer), the polyester, and the cellulose are dissolved in advance; and a plant mix method in which the modified asphalt having the thermoplastic elastomer dissolved in the asphalt is added to the aggregate, and then, the polyester and the cellulose are added thereto. Of these, the premix method is preferred from the viewpoint of rutting resistance and cracking resistance.

More specifically, as for the method for producing the asphalt mixture, the mixing step preferably includes:

(i) a method in which the asphalt (and optionally, the thermoplastic elastomer) is added to and mixed with the heated aggregate to obtain a mixture, to which are then added the polyester and the cellulose, followed by mixing the foregoing mixture with the polyester and the cellulose;

(ii) a method in which the asphalt (and optionally, the thermoplastic elastomer), the polyester, and the cellulose are simultaneously added to and mixed with the heated aggregate; or (iii) a method in which a mixture of the previously heat-mixed asphalt (and optionally, the thermoplastic elastomer), polyester, and cellulose is added to and mixed with the heated aggregated.

Of these, the method (iii) is preferred from the viewpoint of rutting resistance and cracking resistance.

[Road Paving Method]

The asphalt composition of the present invention is suitable for road pavement, and as mentioned above, the asphalt mixture having the aggregate added to the asphalt composition is used for paving the road.

A road paving method of the present invention preferably includes a step of laying the asphalt mixture of the present invention on a road or the like, thereby forming an asphalt paving material layer.

In the road paving method, the asphalt mixture may be subjected to compacting laying using the same laying machines and the same laying method as used for ordinary asphalt mixtures. In the case of using the asphalt mixture as a heated asphalt mixture, from the viewpoint of rutting resistance and cracking resistance, a compacting temperature of the asphalt mixture is preferably 100° C. or higher, more preferably 120° C. or higher, and still more preferably 130° C. or higher, and it is preferably 200° C. or lower, more preferably 180° C. or lower, and still more preferably 170° C. or lower.

In accordance with the present invention, it is possible to provide an asphalt composition enabling one to provide the asphalt pavement in which the occurrence of rutting and fatigue cracking is inhibited and a method for producing the same, and also a method for producing an asphalt mixture.

EXAMPLES

Various properties were measured and evaluated by the following methods.

In the following Examples and Comparative Examples, the terms "parts" and "%" are on a mass basis unless otherwise indicated.

(1) Measurement of Moisture Content

The moisture content of each of pulp and powdery cellulose was measured with an infrared moisture analyzer ("MOC-12011", manufactured by Shimadzu Corporation). Using 5 g of a sample for a single measurement, the sample was levelled and measured at a temperature of 120° C., and a point at which a rate of change in mass for 30 seconds reached 0.05% or less was defined as an end point of the measurement. The measured moisture content was expressed in terms of a mass % relative to the cellulose, thereby defining each moisture content.

(2) Calculation of Crystallization Index

An X-ray diffraction intensity of powdery cellulose was measured with an X-ray diffractometer ("MiniFlex II", manufactured by Rigaku Corporation) under the following condition, and a crystallization index of the type I cellulose on a basis of the aforementioned calculation expression (1).

The measurement was performed under the following condition: X-ray source: Cu/Kα-radiation, tube voltage: 30 kV, tube current: 15 mA, measuring range: diffraction angle 2θ=5 to 35°, scan speed of X-rays: 40°/min. The sample for measurement was prepared by compressing a pellet having an area of 320 mm$^2$ and a thickness of 1 mm.

(3) Acid Value and Hydroxyl Value of Polyester

The acid value and the hydroxyl value of the polyester were measured on a basis of the method of JIS K0070:1992. However, only the measuring solvent was changed from a mixed solvent of ethanol and ether as prescribed in JIS K0070:1992 to a mixed solvent of acetone and toluene (acetone/toluene=1/1 (volume ratio)).

(4) Softening Point of Polyester

Using a flow tester "CFT-500D" "(manufactured by Shimadzu Corporation), while heating 1 g of a sample at a temperature rise rate of 6° C./min, a load of 1.96 MPa was applied by a plunger, and the sample was extruded through a nozzle having a diameter of 1 mm and a length of 1 mm. The amount of descent of the plunger of the flow tester versus the temperature was plotted, and a temperature at which a half amount of the sample flowed out was defined as the softening point of the sample.

(5) Glass Transition Point of Polyester

Using a differential scanning calorimeter "Q-100" (manufactured by TA Instruments Japan Inc.), 0.01 to 0.02 g of a sample was weighed in an aluminum pan, subjected to temperature rise to 200° C., and then cooled from that temperature to 0° C. at a temperature drop rate of 10° C./min. Subsequently, the resulting sample was measured while raising the temperature to 150° C. at a temperature rise rate of 10° C./min. A temperature at which an extension of a baseline of not higher than the maximum endothermic peak temperature was intersected with a tangential line having a maximum inclination of the curve in a region of from a rise-up portion of the peak to an apex of the peak was read as the glass transition point of the sample.

Production Method 1

(Production of Amorphous Cellulose)

(1) Cutting Treatment

A sheet-form wood pulp ("Biofloc HV+", manufactured by Tembec, Inc., crystallization index: 82%, moisture content: 8.5% by mass) as a cellulose-containing raw material was cut in a chip form having a size of about 3 mm×1.5 mm×1 mm by using a cutting machine.

(2) Drying Treatment

The pulp obtained by the above cutting treatment (1) was dried through a continuous treatment with a twin-screw horizontal agitated dryer (a twin-screw paddle dryer: "NPD-3W (1/2)", manufactured by Nara Machinery Co., Ltd.). Steam at 150° C. was used as a heating medium of the dryer, and the treatment was performed at a supply rate of the pulp of 45 kg/h under atmospheric pressure. The moisture content of the pulp after drying was 0.3%.

(3) Decrystallization Treatment of Cellulose

The dry pulp obtained by the above drying treatment (2) was coarsely pulverized with a continuous-type vibration mill ("Vibro mill, YAMT-200", manufactured by Uras Techno Co., Ltd., capacities of first and second pulverization chambers: 112 L, made by stainless steel). The first and second pulverization chambers were each accommodated with 80 stainless steel-made round-form pulverizing media (rods) having a diameter of 30 mm and a length of 1,300 mm. The dry pulp was supplied at a rate of 20.0 kg/h under a condition of the continuous-type vibration mill at a vibration number of 16.7 Hz and an amplitude of 13.4 mm.

(4) Particle Diameter Reduction Treatment of Cellulose

The amorphous cellulose obtained in the above decrystallization treatment (3) was subjected to particle diameter reduction with a high-speed rotary pulverizer (a product name: "ATOMIZER AIIW-5 Type", manufactured by DALTON Corporation). A screen with an opening of 1.0 mm was installed; the pulverizer was driven at a rotor peripheral speed of 8,000 r/min and at a rate of 50 m/s; the amorphous cellulose was supplied from a raw material supply part at the same supply rate as that in the decrystallization treatment; and the amorphous cellulose was recovered from a discharge port. In the resulting amorphous cellulose, the moisture content was 2.5% by mass, the crystallization index was 0%, and the volume medial particle diameter (median diameter, D50) was 62 μm.

The treatments (1) to (4) were carried out in continuous manner.

Production Example 2

(Production of Surface-Hydrophobized Cellulose A)

(1) Cutting Treatment

A sheet-form wood pulp ("Biofloc HV+", manufactured by Tembec, Inc., crystallization index: 82%, moisture content: 8.5% by mass) as a cellulose-containing raw material was cut in a chip form having a size of about 3 mm×1.5 mm×1 mm by using a cutting machine.

(2) Drying Treatment

The pulp obtained by the above cutting treatment (1) was dried through a continuous treatment with a twin-screw horizontal agitated dryer (a twin-screw paddle dryer: "NPD-3W (1/2)", manufactured by Nara Machinery Co., Ltd.). Steam at 150° C. was used as a heating medium of the dryer, and the treatment was performed at a supply rate of the pulp of 45 kg/h under atmospheric pressure. The moisture content of the pulp after drying was 0.3%.

(3) Decrystallization Treatment of Cellulose

The dry pulp obtained by the above drying treatment (2) and a surface hydrophobizing agent were mixed and pulverized with a batch-type vibration mill ("Vibration Mill, FV-10", manufactured by Chuo Kakohki Co., Ltd., capacity of pulverization chamber: 33 L, made by stainless steel). The pulverization chamber was accommodated with 63 stainless steel-made round-form pulverizing media (rods) having a diameter of 30 mm and a length of 510 mm. 613 g of the dry pulp and 307 g of the surface hydrophobizing agent ("UMEX 1001", manufactured by Sanyo Chemical Industries, Ltd., maleic anhydride-modified polypropylene, acid value: 26 mgKOH/g, weight average molecular weight Mw=45,000) were charged and then mixed and pulverized (pulverization time: 10 minutes) under a condition of the batch-type vibration mill at a vibration number of 20 Hz and an amplitude of 8 mm.

(4) Particle Diameter Reduction Treatment of Cellulose

The surface-hydrophobized cellulose obtained by the above mixing and pulverizing treatment (3) was subjected to particle diameter reduction with a high-speed rotary pulverizer (a product name: "Free Pulverizer M-3 Type", manufactured by Nara Machinery Co., Ltd.). A screen with an opening of 1.0 mm was installed; the pulverizer was driven at a rotor peripheral speed of 7,700 r/min and at a rate of 81 m/s; the surface-hydrophobized cellulose was supplied from a raw material supply part at a rate of 18 kg/h; and the surface-hydrophobized cellulose was recovered from a discharge port. In the resulting surface-hydrophobized cellulose, the moisture content was 1.0% by mass, the crystallization index was 37%, and the volume medial particle diameter (D50) was 44 μm.

The treatments (1) to (2) were carried out in a continuous manner, and the treatments (3) to (4) were carried out in a batch manner.

Production Example 3

(Production of Surface-Hydrophobized Cellulose B)

A surface-hydrophobized cellulose B was obtained in the same manner as in Production Example 2, except for changing the surface hydrophobizing agent to 307 g of "SMA" (styrene-maleic acid copolymer, acid value: 105 to 135 mgKOH/g, weight average molecular weight Mw=14,400), manufactured by Cray Valley.

Production Example 4

(Production of Surface-Hydrophobized Cellulose C)

A surface-hydrophobized cellulose C was obtained in the same manner as in Production Example 2, except for changing the surface hydrophobizing agent to 83.6 g of "ASAN-PT" (alkenylsuccinic acid, C12 component: 80 mol %, saponification value: 433.9 mgKOH/g, molecular weight=258.6), manufactured by Kao Corporation.

Production Example 5

(Poly Ester Resin A)

An alcohol component for a polyester, which is shown in Table 1, and terephthalic acid were charged in a 5 liter-volume four-necked flask equipped with a thermometer, a stainless steel-made stirring rod, a flow-down type condenser, and a nitrogen inlet tube; 20 g of tin(II) di(2-ethylhexanoate) and 2 g of gallic acid were then added in a nitrogen atmosphere; and the contents were subjected to temperature rise to 235° C. over 3 hours in a mantle heater and after reaching 235° C., were held for 7 hours. The resultant was allowed to react under reduced pressure at 8.0 kPa, and the reaction was performed until reaching a softening point shown in the table, thereby obtaining the targeted polyester resin A.

Production Example 6

(Poly Ester Resin B)

An alcohol component for a polyester, which is shown in Table 1, and terephthalic acid were charged in a 5 liter-volume four-necked flask equipped with a thermometer, a stainless steel-made stirring rod, a flow-down type condenser, and a nitrogen inlet tube; 20 g of tin(II) di(2-ethylhexanoate) and 2 g of gallic acid were then added in a nitrogen atmosphere; and the contents were subjected to temperature rise to 235° C. over 3 hours in a mantle heater and after reaching 235° C., were held for 5 hours. Then, the resultant was allowed to react under reduced pressure at 8.0 kPa for 1 hour. Thereafter, the resultant was cooled to 180° C.; adipic acid was then added; the contents were subjected to temperature rise to 210° C. over 2 hours and then held at 210° C. for 1 hour; and the resultant was allowed to react under reduced pressure at 8.0 kPa. Then, the reaction was performed until reaching a softening point shown in the table, thereby obtaining the targeted polyester resin B.

TABLE 1

| Production Example | | | 5 | | 6 | |
|---|---|---|---|---|---|---|
| Resin | | | A | | B | |
| | | | Amount of charge (g) | Molar ratio *3 | Amount of charge (g) | Molar ratio *3 |
| Raw material monomers | Alcohol component | BPA-PO *1 | 997 | 35 | 1943 | 70 |
| | | BPA-EO *2 | 1719 | 65 | 773 | 30 |
| | Carboxylic acid component | Terephthalic acid | 1284 | 95 | 1053 | 80 |
| | | Adipic acid | — | — | 232 | 20 |
| Esterification catalyst | Tin(II) di(2-ethylhexanoate) | | 20 g | | 20 g | |
| Cocatalyst | Gallic acid | | 2 g | | 2 g | |
| Properties | Softening point (° C.) | | 112.3 | | 114.0 | |
| | Glass transition point (° C.) | | 68.4 | | 63.0 | |
| | Acid value (mgKOH/g) | | 4.1 | | 7.8 | |
| | Hydroxyl value (mgKOH/g) | | 24.0 | | 10.4 | |

*1 BPA-PO: Polyoxypropylene (2.2) adduct of bisphenol A
*2 BPA-EO: Polyoxyethylene (2.2) adduct of bisphenol A
*3 Molar amount (molar ratio) relative to 100 mol of alcohol component Example A1

To 100 parts of a polymer-modified asphalt ("HR Binder", manufactured by Toa Road Corporation) having been previously heated to 180° C., 1 part of the surface-hydrophobized cellulose A prepared in Production Example 2 and 20 parts of the polyester resin A prepared in Production Example 5 were added and agitated with a homomixer for 2 hours under a condition at a rotation number of 8,000 r/min and an inner temperature of 180° C., thereby obtaining an asphalt composition.

Examples A2 to A9 and Comparative Examples A1 to A4

Asphalt compositions were obtained in the same manner as in Example A1, except that in Example A1, the kinds and amounts of the surface-hydrophobized cellulose and the polyester resin were changed as shown in Table 2. In Example A9, a crystalline cellulose ("KC FLOCK W-50GK", manufactured by Nippon Paper Industries, Co., Ltd., crystallization index: 62%, median diameter: 45 μm) was used as a cellulose D.

TABLE 2

| | | Polyester | | Cellulose | | Durability evaluation | |
|---|---|---|---|---|---|---|---|
| | | | Addition | | Addition | | |
| | | Kind | amount (parts) *1 | Kind | amount (parts) *1 | Rutting (amount mm) | Displacement amount (mm) |
| Example | A1 | A | 20 | A | 1 | 2.5 | 1.52 |
| | A2 | A | 20 | A | 0.5 | 5.5 | —*2 |
| | A3 | A | 15 | A | 1 | 11.0 | —*2 |
| | A4 | A | 20 | B | 1 | 8.0 | 1.4 |
| | A5 | A | 20 | C | 1 | 4.0 | 1.46 |

TABLE 2-continued

|  |  | Polyester | | Cellulose | | Durability evaluation | |
|---|---|---|---|---|---|---|---|
|  |  | Kind | Addition amount (parts) *1 | Kind | Addition amount (parts) *1 | Rutting (amount mm) | Displacement amount (mm) |
|  | A6 | B | 20 | A | 1 | 3.0 | 1.5 |
|  | A7 | B | 20 | B | 1 | 8.5 | — *2 |
|  | A8 | B | 20 | C | 1 | 4.0 | — *2 |
|  | A9 | A | 20 | D | 1 | 14.5 | 1.34 |
| Comparative Example | A1 | A | 20 | — | — | 17.0 | 0.98 |
|  | A2 | — | — | A | 1 | 21.0 | — *2 |
|  | A3 | — | — | C | 1 | 22.0 | — *2 |
|  | A4 | — | — | — | — | 25.0 | — *2 |

*1 Addition amount (parts) relative to 100 parts of asphalt
*2 The symbol "—" in the table expresses "non-measured".

Example B1

To 100 parts of a polymer-modified asphalt ("Performance Grade Asphalt PG76-22", manufactured by Ergon Asphalt & Emulsions, Inc.) having been previously heated to 180° C., 1 part of the surface-hydrophobized cellulose A prepared in Production Example 2 and 3 parts of the polyester resin A prepared in Production Example 5 were added and agitated with a homomixer for 2 hours under a condition at a rotation number of 8,000 r/min and an inner temperature of 180° C., thereby obtaining an asphalt composition.

Examples B2 to B3 and Comparative Examples B1 to B4

Asphalt compositions were obtained in the same manner as in Example B1, except that in Example B1, the kinds and amounts of the surface-hydrophobized cellulose and the polyester resin were changed as shown in Table 3.

TABLE 3

|  |  | Polyester | | Cellulose | | Durability evaluation | |
|---|---|---|---|---|---|---|---|
|  |  | Kind | Addition amount (parts) *1 | Kind | Addition amount (parts) *1 | Rutting amount (mm) | Displacement amount (mm) |
| Example | B1 | A | 3 | A | 1 | 2.0 | 2.21 |
|  | B2 | A | 3 | B | 1 | 4.0 | 2.15 |
|  | B3 | A | 3 | C | 1 | 2.5 | 2.20 |
| Comparative Example | B1 | A | 3 | — | — | 8.0 | 1.92 |
|  | B2 | — | — | A | 1 | 10.0 | 1.90 |
|  | B3 | — | — | C | 1 | 10.5 | 1.90 |
|  | B4 | — | — | — | — | 14.0 | 1.84 |

*1 Addition amount (parts) relative to 100 parts of asphalt

With respect to the asphalt compositions obtained in the Examples and Comparative Examples, the following durability evaluations were performed. The results are shown in Tables 2 and 3.

[Durability Evaluation (Rutting Amount)]

11 kg of an aggregate heated at 180° C. was put into an asphalt mixer heated at 180° C. (20-liter volume, "AI-110-B", manufactured by Iwata Kogyosho K.K.) and mixed for 60 seconds, into which was then put 621 g of asphalt (polyester: 3 parts) or 723 g (polyester: 20 parts) having been previously heat-mixed at 180° C., or 603 g of asphalt (polyester: 0 part) as simply heat-melted, and mixed for 120 seconds. After curing the mixed asphalt mixture in an oven (180° C.) for 2 hours, the resultant was filled in a metallic form (300×300×50 mm) and subjected to rolling compaction under a load at a linear pressure of 29.4 kN/m by using a pneumatic roller compactor (manufactured by Iwata Kogyosho K.K.), thereby fabricating a wheel tracking test piece. The fabricated test piece was cooled overnight at room temperature and then subjected to a rutting amount measuring test with a submerged wheel tracking tester ("AI-1100-S", manufactured by Iwata Kogyosho K.K.). The measurement condition is 60° C. for measurement temperature, 15±1 times/min for traveling speed, 100 kgf for wheel load, and 2,500 times for traveling frequency.

(Formulation of Aggregate)

Crushed stone (small) from Ieshima: 52% by mass
Crushed sand from Ieshima: 10% by mass
River sand from Ibigawa: 22% by mass
Crushed sand available from Kouga Ballas Co., Ltd.: 10% by mass
NEOFLOW available from Shimizu Kogyo Co., Ltd.: 5% by mass

[Durability Evaluation (Displace Amount)]

To 200 g of Toyoura standard sand heated at 180° C., 14 g of asphalt heat-mixed at 180° C. was added and mixed by means of manual kneading. That is, the polyester blending is external addition relative to the asphalt. After curing the mixture in an oven (180° C.) for 2 hours, the resultant was filled in a metallic form (24×200×24 mm) by means of hand-packing. After cooling overnight at room temperature, the surface was flattened with a metal spatula, followed by form removal to obtain a test piece for bending test.

The bending test measurement was performed with a Tensilon universal material testing machine ("RTC-1210A", manufactured by A&D Company, Limited). As for the measured value, the displacement amount at a maximum load was defined as a breaking point (inflection point). As for the measurement condition, a 1 kN load cell is used; the inter-fulcrum distance is 150 mm; a head speed is 10 mm/min; and a sampling space is 0.02 mm.

The polymer-modified asphalt used in Table 2 is a light-weight system and smooth, whereas the polymer-modified asphalt used in Table 3 is a heavy-weight system and tends to be hard. From the difference in this property, a difference is brought in the results between Table 2 and Table 3. From the results of Tables 2 and 3, it is noted that in accordance with the asphalt compositions of the Examples, an asphalt pavement in which the occurrence of rutting and fatigue cracking is inhibited is obtained, as compared with the asphalt compositions of the Comparative Examples.

The invention claimed is:

1. An asphalt composition, comprising:
asphalt, cellulose, and a polyester, wherein,
based on 100 parts by mass of the asphalt, a content of the cellulose is 0.01 parts by mass or more and 10 parts by mass or less and a content of the polyester is 2 parts by mass or more and 30 parts by mass or less; and
the cellulose has a crystallization index of 50% or less, the crystallization index being a crystallization index of type I cellulose calculated from a diffraction intensity value measured by an X-ray crystal diffraction method according to the Segal method and defined by formula (A):

$$\text{Crystallization index of cellulose (\%)} = [(I_{22.6} - I_{18.5})/I_{22.6}] \times 100 \qquad (A)$$

where $I_{22.6}$ represents a diffraction intensity of a lattice (002) plane in the X-ray diffraction measured at a diffraction angle 2θ of 22.6°, and $I_{18.5}$ represents a diffraction intensity of an amorphous part measured at a diffraction angle 2θ of 18.5°.

2. The asphalt composition according to claim 1, wherein the cellulose has a median diameter of 5 μm or more and 200 μm or less.

3. The asphalt composition according to claim 1, wherein the polyester has a softening point of 90° C. or higher and 140° C. or lower and a glass transition point of 40° ° C. or higher and 80° C. or lower.

4. A road pavement composition, comprising:
the asphalt composition according to claim 1.

5. A method for producing the asphalt composition according to claim 1, the method comprising:
mixing the asphalt, the cellulose, and the polyester.

6. A method for paving a road, the method comprising:
applying the asphalt composition according to claim 1 to the road.

7. The asphalt composition according to claim 1, wherein the polyester contains an alcohol component-derived structural unit containing 60 mol % or more of an alkylene oxide adduct of bisphenol A and a carboxylic acid component-derived structural unit.

8. The asphalt composition according to claim 7, wherein a molar ratio of the carboxylic acid component-derived structural unit to the alcohol component-derived structural unit is 0.7 or more and 1.5 or less.

9. The asphalt composition according to claim 7, wherein the polyester has an acid value of 2 mgKOH/g or more and 30 mgKOH/g or less.

10. The asphalt composition according to claim 7, wherein the polyester has a hydroxyl value of 1 mgKOH/g or more and 70 mgKOH/g or less.

11. A method for producing an asphalt mixture, the method comprising:
(i) mixing asphalt, a polyester, and cellulose to obtain an asphalt composition; and then
(ii) mixing the asphalt composition with an aggregate,
wherein the cellulose has a crystallization index of 50% or less, the crystallization index being a crystallization index of type I cellulose calculated from a diffraction intensity value measured by an X-ray crystal diffraction method according to the Segal method and defined by formula (A):

$$\text{Crystallization index of cellulose (\%)} = [(I_{22.6} - I_{18.5})/I_{22.6}] \times 100 \qquad (A)$$

where $I_{22.6}$ represents a diffraction intensity of a lattice (002) plane in the X-ray diffraction measured at a diffraction angle 2θ of 22.6°, and $I_{18.5}$ represents a diffraction intensity of an amorphous part measured at a diffraction angle 2θ of 18.5°.

12. The method according to claim 11, wherein said mixing (i) occurs at a mixing temperature of 100° C. or higher and 230° C. or lower.

13. A asphalt composition, comprising:
asphalt, cellulose, and a polyester, wherein
the cellulose has been subjected to a surface hydrophobization treatment with a surface hydrophobizing agent; and
the cellulose has a crystallization index of 50% or less, the crystallization index being a crystallization index of type I cellulose calculated from a diffraction intensity value measured by an X-ray crystal diffraction method according to the Segal method and defined by formula (A):

$$\text{Crystallization index of cellulose (\%)} = [(I_{22.6} - I_{18.5})/I_{22.6}] \times 100 \qquad (A)$$

where $I_{22.6}$ represents a diffraction intensity of a lattice (002) plane in the X-ray diffraction measured at a diffraction angle 2θ of 22.6°, and $I_{18.5}$ represents a diffraction intensity of an amorphous part measured at a diffraction angle 2θ of 18.5°.

14. The asphalt composition according to claim 13, wherein an amount of the cellulose that has been treated with the surface hydrophobizing agent is 1 part by mass or more and 100 parts by mass or less based on 100 parts by mass of the cellulose that has not been treated with the surface hydrophobizing agent.

15. The asphalt composition according to claim 13, wherein the surface hydrophobizing agent is at least one selected from the group consisting of a silane-based coupling agent, a titanate-based coupling agent, an aluminum-based coupling agent, a polymer having a polar group and a polyolefin chain or a polystyrene chain, and a saturated aliphatic compound having a polar group.

16. The asphalt composition according to claim 15, wherein the surface hydrophobizing agent comprises a polymer having a polar group and a polyolefin chain, which is a maleic anhydride-modified polypropylene or a maleic anhydride-modified polyethylene.

* * * * *